United States Patent [19]

Wakumura

[11] Patent Number: 4,864,433
[45] Date of Patent: Sep. 5, 1989

[54] MAGNETIC RECORDING AND REPRODUCING DEVICE

[75] Inventor: Shin-ichi Wakumura, Saitama, Japan
[73] Assignee: Pioneer Electronic Corporation, Tokyo, Japan
[21] Appl. No.: 138,123
[22] Filed: Dec. 28, 1987
[30] Foreign Application Priority Data Dec. 27, 1986 [JP] Japan .................................. 61-315223

[51] Int. Cl.$^4$ .......................... G11B 5/09; G11B 15/04
[52] U.S. Cl. ............................................ 360/51; 360/60
[58] Field of Search ........................ 360/51, 60, 69, 27

[56] References Cited
U.S. PATENT DOCUMENTS 4,040,022  8/1977  Takii ...................................... 360/51
4,785,361 11/1988  Brotby ................................... 360/60

Primary Examiner—Vincent P. Canney
Attorney, Agent, or Firm—Sughrue, Mion, Zinn, Macpeak & Seas

[57] ABSTRACT

In a magnetic recording and reproducing circuit, a PLL circuit extracts a clock signal from the input signal while a clock generating circuit outputs a clock signal independently of the input signal, and one of the clock signals thus obtained is applied to a signal processing circuit depending on whether or not the PLL is in a locked state. When the PLL circuit is not in a locked state, the independently generated clock signal is used, and the processing circuit outputs data substantially at zero level, whereby the recording of noises on the magnetic tape is prevented.

8 Claims, 1 Drawing Sheet

MAGNETIC RECORDING AND REPRODUCING DEVICE

BACKGROUND OF THE INVENTION

This invention relates to a magnetic recording and reproducing device a typical example of which is a digital audio tape machine known as an R-DAT.

In an R-DAT, PCM audio signals and sub-code signals are recorded on a magnetic tape in a digital mode. These data are modulated so that a clock pulse necessary for demodulation can be extracted from the reproducing signal. In a magnetic recording and reproducing device, the clock pulse is extracted from the recording or reproducing signal, and a variety of timing signals are formed in synchronization with the clock pulse to control the rotary drums, the capstans, etc..

As described above, in the conventional magnetic recording and reproducing device, the clock pulse is extracted from the recording or reproducing signal, and the timing signals are formed according to the clock signal. Therefore, if the clock pulse is not formed for some reason, abnormal sounds (noises) are recorded on the magnetic tape.

SUMMARY OF THE INVENTION

Accordingly, an object of this invention is to eliminate the above-described difficulty accompanying a conventional magnetic recording and reproducing device.

The foregoing object and other objects of the invention have been achieved by the provision of a magnetic recording and reproducing device which, according to the invention, comprises: a PLL circuit for extracting a clock pulse from an input signal; a data extracting circuit for extracting data from the input signal; a clock generating circuit for generating a clock pulse independently of the input signal; a detecting circuit for detecting the locked state of the PLL circuit; a switch for selecting, in response to an output of the detecting circuit, one of the clock pulses which are output by the PLL circuit and the clock generating circuit; and a signal processing circuit which, when the PLL circuit is not locked, provides substantially zero level data as the data output by the extracting circuit.

BRIEF DESCRIPTION OF THE DRAWINGS

The invention will be more clearly understood from the following description in conjunction with the accompanying drawings, in which.

DETAILED DESCRIPTION OF THE INVENTION

One example of a magnetic recording and reproducing device according to this invention will be described with reference to the accompanying drawing.

Figure 2:
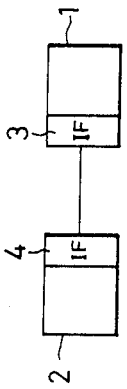

In FIG. 2, reference numeral 1 designates an R-DAT which is one digital device and has a digital interface 3; and reference numeral 2, designates an R-DAT which is another digital device and has a digital interface 4. For instance, a digital signal reproduced by the R-DAT 2 is applied through the digital interfaces 4 and 3 to the R-DAT 1, where it is subjected to dubbing.

Figure 1:
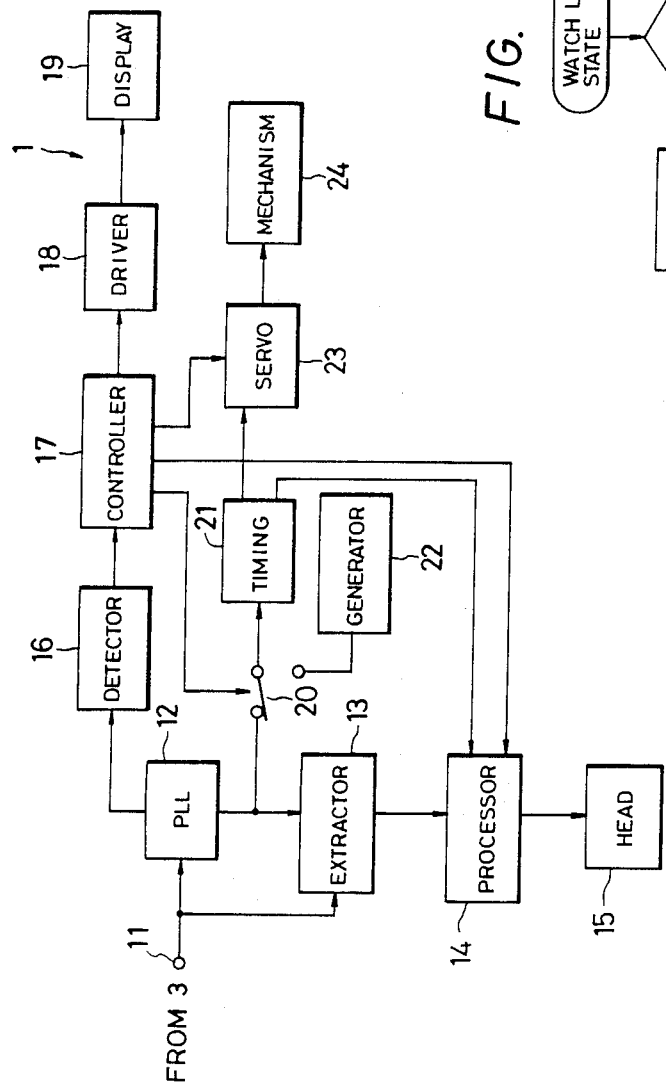
FIGS. 1 and 2 are block diagrams showing one example of a magnetic recording and reproducing device according to this invention.

The R-DAT 1 of FIG. 2 is shown in more detail in FIG. 1, except for the interface portion 3. In FIG. 1, a digital signal input through an input terminal 11 from the digital interface 3 is supplied to a PLL circuit 12 and an extracting circuit 13. The PLL circuit 12 extracts a clock pulse from the input signal. The clock pulse thus extracted is applied to the extracting circuit 13. The circuit 13 demodulates and extracts data with reference to the clock pulse, and supplies it to a signal processing circuit 14.

A detecting circuit 16 detects whether or not the PLL circuit 12 has locked with the clock pulse. Upon detection of the locked state of the PL1 circuit, the detecting circuit 16 applies a lock detection signal to a control circuit 17 which essentially comprises a microcomputer. When the PLL circuit 12 is not in a locked state, the control circuit 17 causes a drive circuit 18 to operate a display unit 19, consisting essentially of LEDs or lamps, to display the fact that the PLL circuit 12 is unlocked. The operator can detect from the display that the recording operation is not proceeding normally, and, if necessary, he can suspend the recording (dubbing) operation. In this connection, the device may be designed so that the control circuit 17 controls a servo circuit 23 adapted to drive a capstan and a rotary drum (i.e., mechanism 24) so that the device is automatically stopped or placed in record pause state. This will not only improve the operability of the device but also avoids the recording of noise or a pattern different from the correct format.

The control circuit 17 connects the armature of a switch 20 to the PLL circuit 12 when the PLL circuit is in a locked state, and connects it to a clock generating circuit 22 when the PLL circuit is in an unlocked state. The clock generating circuit 22 comprises, for instance, a fixed oscillation circuit which outputs a clock pulse independently of the input signal. With this arrangement, the clock pulse output by the PLL circuit 12 is selected when the PLL circuit 12 is in a locked state, and the clock pulse provided by the clock generating circuit 22 is selected when the PLL circuit 12 is not in a locked state. The clock pulse thus selected is applied to a timing circuit 21.

The timing circuit 21 produces a head switching pulse and other timing signals in synchronization with the clock pulse applied thereto. The output clock signal of the timing circuit 21 is applied to servo circuit 23. The servo circuit 23, in synchronization with the input clock signal, controls a mechanism 24 comprising the capstans and the rotary drums. Accordingly, even if the PLL circuit 12 is placed in an unlocked state, the rotation of the capstans and the rotary drums is controlled in synchronization with the clock pulse output by the clock generating circuit 22, so that the magnetic tape continues to run regularly at all times.

The clock signal produced by the timing circuit 21 is further applied to the above-described signal processing circuit 14. When the PLL circuit 12 is in a locked state, the control circuit 17 controls the signal processing circuit 14 so that the signal processing circuit 14 processes the data applied thereto from the extracting circuit 13 with reference to the clock signal received from the timing circuit 21. The data thus processed is applied to a recording head 15 so that it is recorded on the magnetic tape (not shown).

On the other hand, when the PLL circuit is not in a locked state, the control circuit 17 causes the signal processing circuit 14 to output the same signal as that which is provided when the input signal (audio signal) is muted. As a result, the input audio data is recorded as data substantially at 0 level on the magnetic tape. This will prevent the recording of abnormal sounds (noises) on the magnetic tape, and ensure the continuation of a pattern (the continuation of a sub-code signal) on the magnetic tape. When the detector detects that the PLL has returned to the locked state, the control circuit 17 causes the switch 20 to switch back to the output of the PLL.

Figure 3:
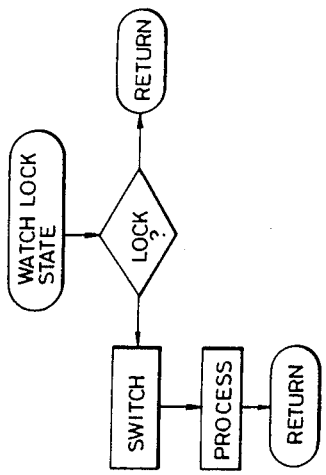
FIG. 3 is a flow chart for a description of the operation of the device.

The above-described operations are as shown in a flow chart of FIG. 3. In the flow chart, the term "Process" is intended to mean the controls for display, audio signal muting operation, stop, and pause.

As was described above, the magnetic recording and reproducing device of the present invention comprises: the PLL circuit for extracting the clock pulse from the input signal; the extracting circuit for extracting data from the input signal; the clock generating circuit for producing the clock pulse independently of the input signal; the detecting circuit for detecting the locked state of the PLL circuit; the switch means for selecting one of the clock pulses output by the PLL circuit and the clock generating circuit, according to the output of the detecting circuit; and the signal processing circuit which, when the PLL circuit is in an unlocked state, outputs the data provided by the extracting circuit as data substantially at zero level. Therefore, in the device of the present invention, the recording of abnormal sounds on the magnetic tape can be prevented even when it becomes impossible to extract the clock pulse from the input signal.

What is claimed:

1. A magnetic recording and reproducing device for extracting data from an input signal and providing said data as a recording output signal for recording, said device comprising:

clock signal extraction means for extracting a first clock signal from said input signal;

data extracting means for extracting data from said input signal;

clock generating means for generating a second clock signal independently of said input signal;

detecting means for detecting when said first clock signal is accurately generated;

switch means responsive to an output of said detecting means for selecting one of said first and second clock signals; and signal processing means for providing data other than said extracted data as said recording output signal when said second clock signal is selected.

2. A magnetic recording and reproducing device as claimed in claim 1, wherein said data extracting means extracts said data from said input signal in accordance with said first clock signal.

3. A magnetic recording and reproducing device as claimed in claim 1, wherein said detecting means detects whether or not said first clock is synchronized to said input signal.

4. A magnetic recording and reproducing device as claimed in claim 3, wherein said clock signal extracting means comprises a phase lock loop (PLL) and wherein said detecting means detects whether or not said PLL is phase locked to said input signal.

5. A magnetic recording and reproducing device as claimed in claim 1, wherein said signal processing means provides substantially zero level data as said recording output signal when said second clock signal is selected.

6. A magnetic recording and reproducing device as claimed in claim 1, further comprising means for interrupting a recording operation when said detecting means detects that said first clock signal is not accurately generated.

7. A magnetic recording and reproducing device as claimed in claim 1, further comprising display means for providing a display in accordance with the output of said detecting means.

8. A magnetic recording and reproducing device for extracting data from an input signal and providing said data as a recording output signal for recording, said device comprising:

clock signal extraction means for extracting a clock signal from said input signal;

data extracting means for extracting data from said input signal;

detecting means for detecting when said clock signal is accurately generated; and signal processing means for providing data other than said extracted data as said recording output signal when said clock signal is not accurately generated.

* * * * *